US007593017B2

(12) United States Patent
Thielen et al.

(10) Patent No.: US 7,593,017 B2
(45) Date of Patent: Sep. 22, 2009

(54) DISPLAY SIMULATOR

(75) Inventors: James A. Thielen, Shoreview, MN (US); Scott J. Reckinger, Boulder, CO (US); Richard J. Moore, Maplewood, MN (US); Patrick A. Thomas, Lake Elmo, MN (US); Manoj Nirmal, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 400 days.

(21) Appl. No.: 11/464,620

(22) Filed: Aug. 15, 2006

(65) Prior Publication Data

US 2008/0043043 A1 Feb. 21, 2008

(51) Int. Cl.

| | |
|---|---|
| ***G09G 5/00*** | (2006.01) |
| ***G06T 15/50*** | (2006.01) |
| ***G09G 5/02*** | (2006.01) |
| ***H04N 11/20*** | (2006.01) |
| ***G01S 7/40*** | (2006.01) |
| ***G06F 3/01*** | (2006.01) |
| ***G06F 3/00*** | (2006.01) |

(52) U.S. Cl. ....................... 345/581; 345/426; 345/630; 345/698; 345/1.2; 348/445; 434/3; 715/700; 715/722

(58) Field of Classification Search ........... 345/1.1–1.2, 345/5, 214, 426, 581, 630, 650, 657, 660, 345/690, 698; 348/441, 445, 556; 434/3–7, 434/366, 369; 715/700, 800, 719–722
See application file for complete search history.

(56) References Cited

U.S. PATENT DOCUMENTS

| | | | |
|---|---|---|---|
| 5,387,985 | A | 2/1995 | Loce et al. |
| 5,394,518 | A | 2/1995 | Friedman et al. |
| 5,696,845 | A | 12/1997 | Loce et al. |
| 5,838,333 | A | 11/1998 | Matsuo |
| 5,956,015 | A | 9/1999 | Hino |
| 6,008,816 | A | 12/1999 | Eisler et al. |
| 6,020,868 | A | 2/2000 | Greene et al. |
| 6,078,936 | A | 6/2000 | Martin et al. |
| 6,810,105 | B2 | 10/2004 | Nasser-Ghodsi et al. |
| 7,009,621 | B1 | 3/2006 | Tong |
| 2003/0095132 | A1 | 5/2003 | Parish et al. |
| 2003/0142782 | A1 | 7/2003 | Nasser-Ghodsi et al. |

(Continued)

FOREIGN PATENT DOCUMENTS

| | | |
|---|---|---|
| EP | 0680200 | 11/1995 |

(Continued)

*Primary Examiner*—Wesner Sajous
(74) *Attorney, Agent, or Firm*—Lance L. Vietzke

(57) ABSTRACT

A system for generating and providing a simulated image. Based upon a source image and first parameters for a first display device, the system generates and displays a simulated image on second display device having second parameters. The first parameters are different from the second parameters, and the simulated image displayed on the second display device provides a visual indication of how the source image would appear when displayed on the first display device. The parameters can include a resolution in pixels per inch and a fill factor for the display device. The system can also be used to provide a visual indication of how the source image would appear when displayed on the second display device under varying lighting conditions and viewing angles.

16 Claims, 7 Drawing Sheets

U.S. PATENT DOCUMENTS

| | | | | |
|---|---|---|---|---|
| 2005/0024391 | A1 | 2/2005 | Damera-Venkata et al. | |
| 2005/0062767 | A1 | 3/2005 | Choe et al. | |
| 2005/0069209 | A1 | 3/2005 | Damera-Venkata et al. | |
| 2006/0250503 | A1* | 11/2006 | Crutchfield et al. | 348/207.99 |
| 2006/0263758 | A1* | 11/2006 | Crutchfield, et al. | 434/367 |
| 2007/0052671 | A1* | 3/2007 | Childers | 345/108 |
| 2007/0110305 | A1* | 5/2007 | Corcoran et al. | 382/167 |
| 2007/0268547 | A1* | 11/2007 | Latypov et al. | 359/237 |
| 2007/0294634 | A1* | 12/2007 | Kokemohr | 715/781 |

FOREIGN PATENT DOCUMENTS

| | | |
|---|---|---|
| EP | 1301025 | 4/2003 |
| JP | 07-110859 | 4/1995 |
| JP | 10-178539 | 6/1998 |
| JP | 2004266860 | 9/2004 |
| JP | 2005222567 | 8/2005 |
| JP | 2006061277 | 3/2006 |
| JP | 2006061626 | 3/2006 |
| WO | WO 0021069 | 4/2000 |
| WO | WO 0060479 | 10/2000 |
| WO | WO 0201546 | 1/2002 |
| WO | WO 03038801 | 5/2003 |
| WO | WO 2005027043 | 3/2005 |
| WO | WO 2006101112 | 9/2006 |

* cited by examiner

DISPLAY SIMULATOR

FIELD OF INVENTION

The present invention relates to a method and apparatus for simulating the appearance of an image on a physical display device.

BACKGROUND

Fabricating a display prototype is a rather complex and time-consuming process. Even for the simplest case of a passive matrix display this fabrication involves at least the following steps: patterning the row and column substrates; laminating the active material between the substrates followed by edge sealing; developing drive electronics and software; and connecting the display to appropriate drive electronics. The fabrication of an active matrix display presents an added challenge due to the need to include one or more transistors for each pixel, integrated into the substrate. While interfacing software (for example, the LabVIEW program (National Instruments Corp.)) and sources for low volume printed circuit boards and electronics have made the task easier, fabricating a prototype that is sufficiently portable and polished for customer validation is much more daunting. As a result, prototyping can take anywhere between a few weeks to several months depending on the particular technology involved and the display specifications, for example size and pixels per inch. Obtaining adequate customer feedback requires screening of numerous display formats, including form factor, pixel density, fill factor, and color gamut. This use of many sample display formats is crucial in the display industry due to the significant capital investments required to establish a manufacturing line to make the displays.

SUMMARY OF INVENTION

A method for generating and providing a simulated image, consistent with the present invention, includes the steps of receiving a source image and first parameters for a first display device, and generating and displaying a simulated image on a second display device having second parameters. The first parameters are different from the second parameters, and the simulated image displayed on the second display device provides a visual indication of how the source image would appear when displayed on the first display device.

An apparatus for generating and providing a simulated image, consistent with the present invention, includes an image module for receiving a source image, a parameters module for receiving first parameters for a first display device, and a generate module for generating and displaying a simulated image on second display device having second parameters. The first parameters are different from the second parameters, and the simulated image displayed on the second display device provides a visual indication of how the source image would appear when displayed on the first display device.

The method and apparatus can also be used to provide a visual indication of how the source image would appear when displayed on the first display device under varying lighting conditions and under varying viewing angles.

BRIEF DESCRIPTION OF THE DRAWINGS

The invention may be more completely understood in the following detailed description of various embodiments of the invention in connection with the accompanying drawings, in which.

DETAILED DESCRIPTION

Introduction

An accurate display simulation is a viable alternative to an actual device for gathering reliable customer feedback and input. Simulations offer numerous advantages over fabricating actual prototypes including significantly lower cost and turn around time, ease of varying virtually all display parameters (e.g., form factor, pixel density, fill factor, color scheme, and content), and portability since they can be demonstrated to customers electronically or in print form.

Figure 1:
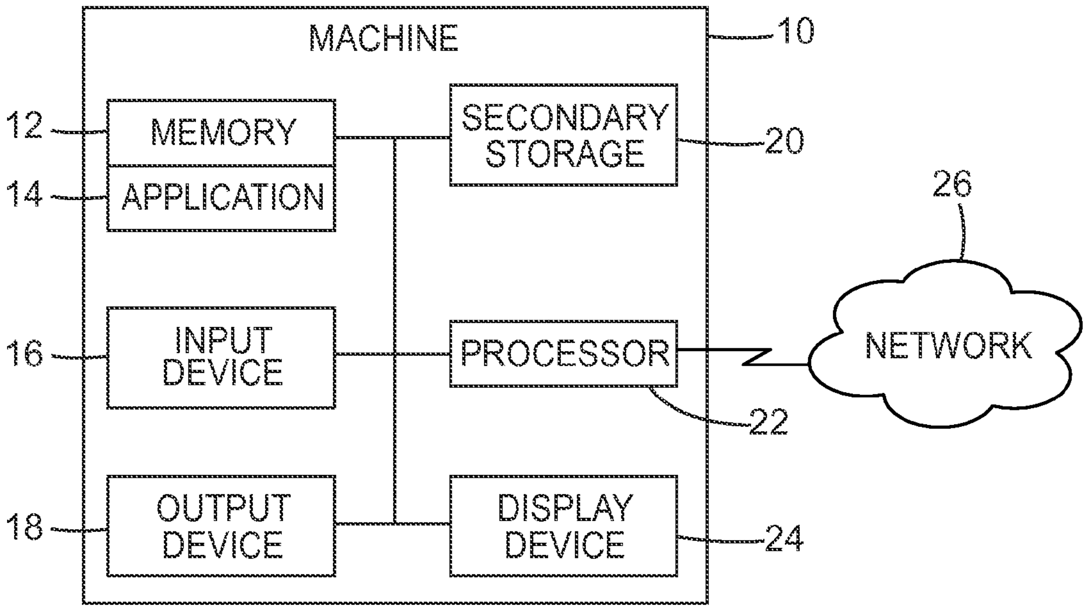
FIG. 1 is a diagram of an exemplary computer system for implementing a display simulator.

FIG. 1 is a diagram of an exemplary machine 10 for use in implementing a display simulator. Machine 10 can include, for example, the following components: a memory 12 storing one or more applications 14; a secondary storage 20 for providing non-volatile storage of information; an input device 16 for entering information or commands into machine 10; a processor 22 for executing applications stored in memory 12 or secondary storage 20, or as received from another source; an output device 18 for outputting information, such as a printer for providing hard copies of information in printed form or speakers for providing information in audio form; and a display device 24 for electronically displaying information in visual or audiovisual form. Machine 20 can include a connection to a network 26 such as the Internet, an intranet, or other type of network.

Display Simulation System

A display simulation software, as executed by machine 10, receives a digital image and simulates its appearance on a display. Two key attributes of a display are the pixel density, measured in pixels per inch (ppi), and the fill factor (also referred to as the aperture ratio). Images created by graphics software, such as the Adobe Photoshop program (Adobe Systems Inc.), typically are seamless, meaning the pixels are in intimate contact with each other. In a real physical display device, however, the manufacturing process limits the proximity of adjacent pixels. In addition, conductive traces and active components such as thin film transistors (TFTs) can mask portions of the display. This leads to an inactive area between a pixel and its nearest neighbors. This region cannot be switched on or off like the active area within the pixels, and it thus influences the appearance of text or graphics when shown on the display. The ratio of the active area to the total area of a display defines its fill factor. Within each frame, each pixel has a defined color and brightness (Red, Green, Blue (RGB) value) while the inactive area has a background color.

To simulate an image as it would appear on a real display the system generates an n×n array of pixels (a "super pixel") for each source pixel in the source image. A fraction of the pixels within the super pixel array, defined by the desired fill factor of the display, is then assigned with the RGB value of the source pixel, while the remaining pixels are filled in with the background color. This process is repeated for each pixel in the source image. The super pixels are then tiled to construct the simulated image. The simulated image may be resized to the original source image size by increasing its pixel density. This resizing maintains the new information encoded in the image while maintaining the dimensions of the source image. The aspect ratio of the source and/or super pixel is not limited to a square and could be any desired shape, for example triangles, circles, polygons, or other shapes. For example, the source pixel could be rectangular or other shape and the super pixel could be an array with n×n' pixels with m×m' pixels assigned with the source pixel RGB value, where n≠n' and m≠m'.

Figure 2:
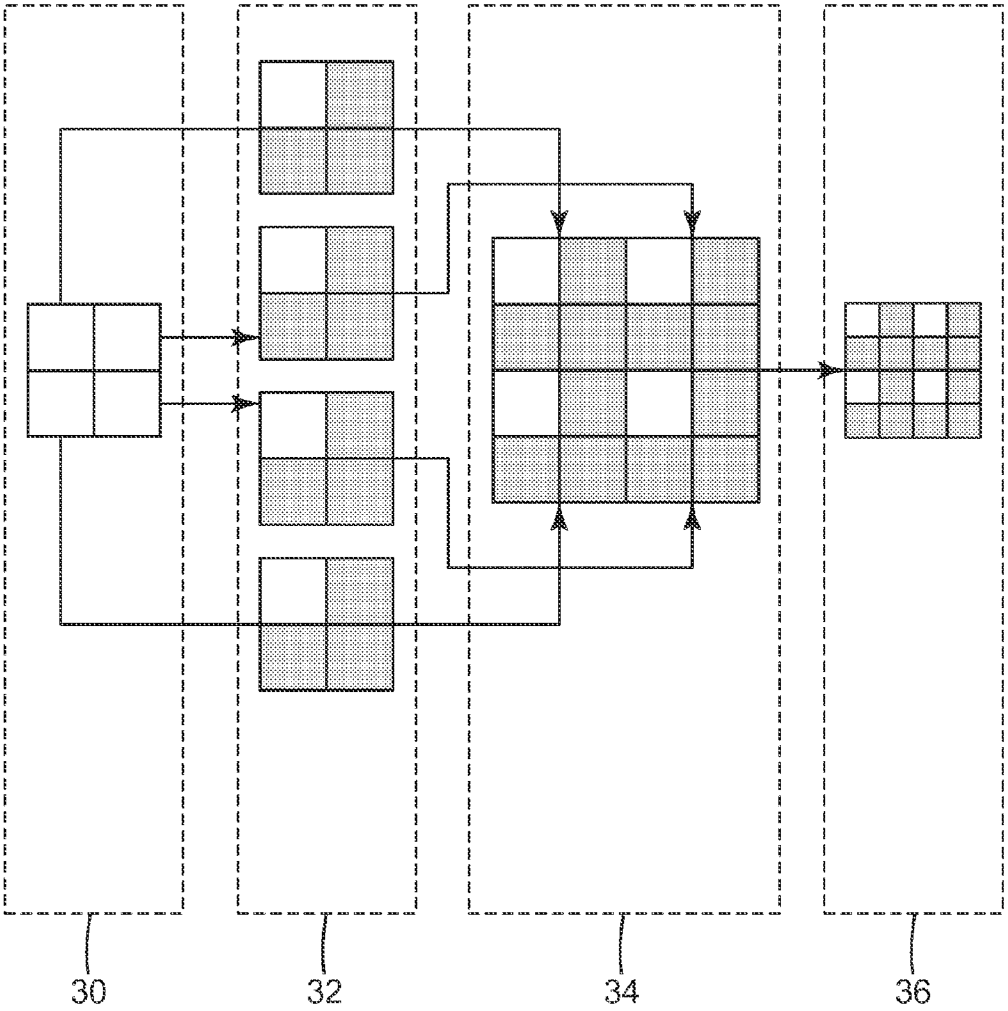
FIG. 2 is a diagram illustrating a display simulation method using super pixels.

FIG. 2 is a diagram illustrating a display simulation method as executed by machine 10. As shown in FIG. 2, a 1 inch×1 inch source image 30 contains 2×2 pixels (2 ppi in the x, y dimensions). To simulate its appearance on a display with a 25% fill factor, a 2 pixel×2 pixel super pixel 32 is created for each source pixel. The upper left corner pixel, for example, of the super pixel is then assigned the RGB value of the source pixel (white) while the remaining 3 pixels are assigned the background color (black or gray, for example). As an alternative to the upper left corner, the section with the source pixel color can be anywhere within the super pixel. Also, if fill factor was the only consideration, the sub pixels within the super pixel having the source pixel color could be randomly distributed within the super pixel. Within each super pixel only 1 out of the 4 pixels is "active," consistent with the 25% fill factor of the simulated display. The super pixels are then tiled to construct the simulated image 34. Since the number of pixels in each dimension has doubled, the individual pixels need to be reduced by a factor of 2 in each dimension to maintain the dimensions of the source image. Therefore, the pixel density is increased from 2 ppi to 4 ppi in a final resized simulated image 36.

Figure 3:
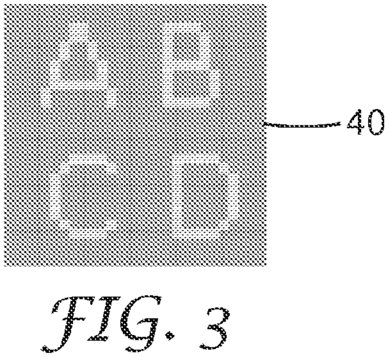
FIG. 3 is a diagram of a sample source image to be simulated.
Figure 4:
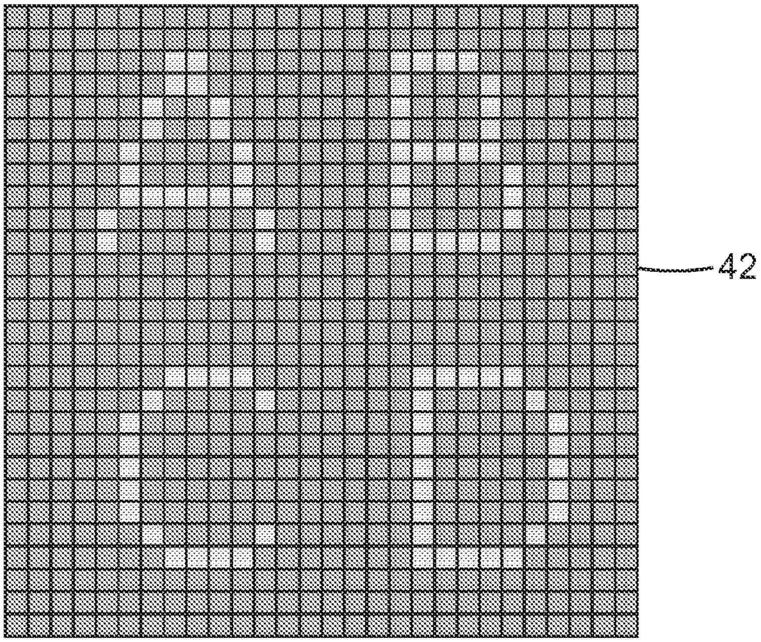
FIG. 4 is a diagram of an unresized simulated image based upon the source image shown in FIG. 3.
Figure 5:
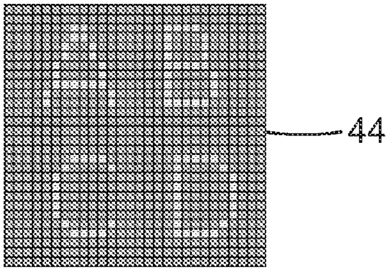
FIG. 5 is a diagram of a resized simulated image based upon the source image shown in FIG. 3.

The display simulation process is illustrated in FIGS. 3-5. The images in FIGS. 3-5 have been scaled down from their original size to fit on the page. FIG. 3 is a diagram of a source image 40 to be simulated. Source image 40 has 20 ppi, a 100% fill factor, and a size of 1.4 inches (28 pixels)×1.4 inches (28 pixels). FIG. 4 is a diagram of a simulated image 42 (unresized) based upon source image 40. Simulated image 40 has 20 ppi, a 64% fill factor, and a size of 7 inches (140 pixels)×7 inches (140 pixels). FIG. 5 is a diagram of a simulated image 44 (resized) based upon source image 40. Simulated and resized image 44 has 100 ppi, a 64% fill factor, and a size of 1.4 inches (140 pixels)×1.4 inches (140 pixels).

To simulate the appearance of the source image 40 on a display with a 64% fill factor, machine 10 executing software generates a 5×5 super pixel from each source pixel. It then assigns the upper left 4×4 pixels (16 total) within each super pixel with the RGB value of the source pixel (light gray) and the remaining pixels (9 total) within the array are assigned the background color (dark gray). For 24 bit color (approximately 16.7 million colors) each R, G, B, color channel is assigned 8 bits (values 0-255) and each pixel is assigned a RGB value in the range (0-255 R, 0-255 G, 0-255 B). The fill factor is determined by the ratio of the number of pixels assigned with the source pixel's RGB value to the total number of pixels within the super pixel, 16/25=64%. Since the number of pixels in both the x and y dimensions have increased by a factor 5, the dimensions of the image 42 have also increased by the same factor. To scale the simulated image to the dimensions of the source image 40, its pixel density is increased by a factor of five. This conserves the number of pixels in the simulation 44 and ensures that no details are lost after resizing.

Comparison of the source and simulated images (40 and 44) reveals the following two main visual effects: the text in the simulated image appears more pixilated since each pixel is highlighted by an inactive border area; and the overall brightness of the image is lower since a significant fraction (36%) of the image is occupied by a dark gray background. In addition to the fill factor, the colors in the simulated image need to be accurately matched to those in the real display. The RGB values of the pixels and the inactive background region in the real display can be determined using color corrected digital cameras, scanners, or imaging colorimeters. The source and simulated images are created using the color palette in the real display.

In this manner, a high resolution display can be used to simulate the appearance of an image on a display having a lower resolution. In other words, a display having first parameters is used to simulate the appearance of an image on a display having second parameters different from the first parameters. These parameters relate to the actual construction of a display device and can include, for example, size (form factor), ppi, and fill factor.

Display Simulator Screen

Figure 6:
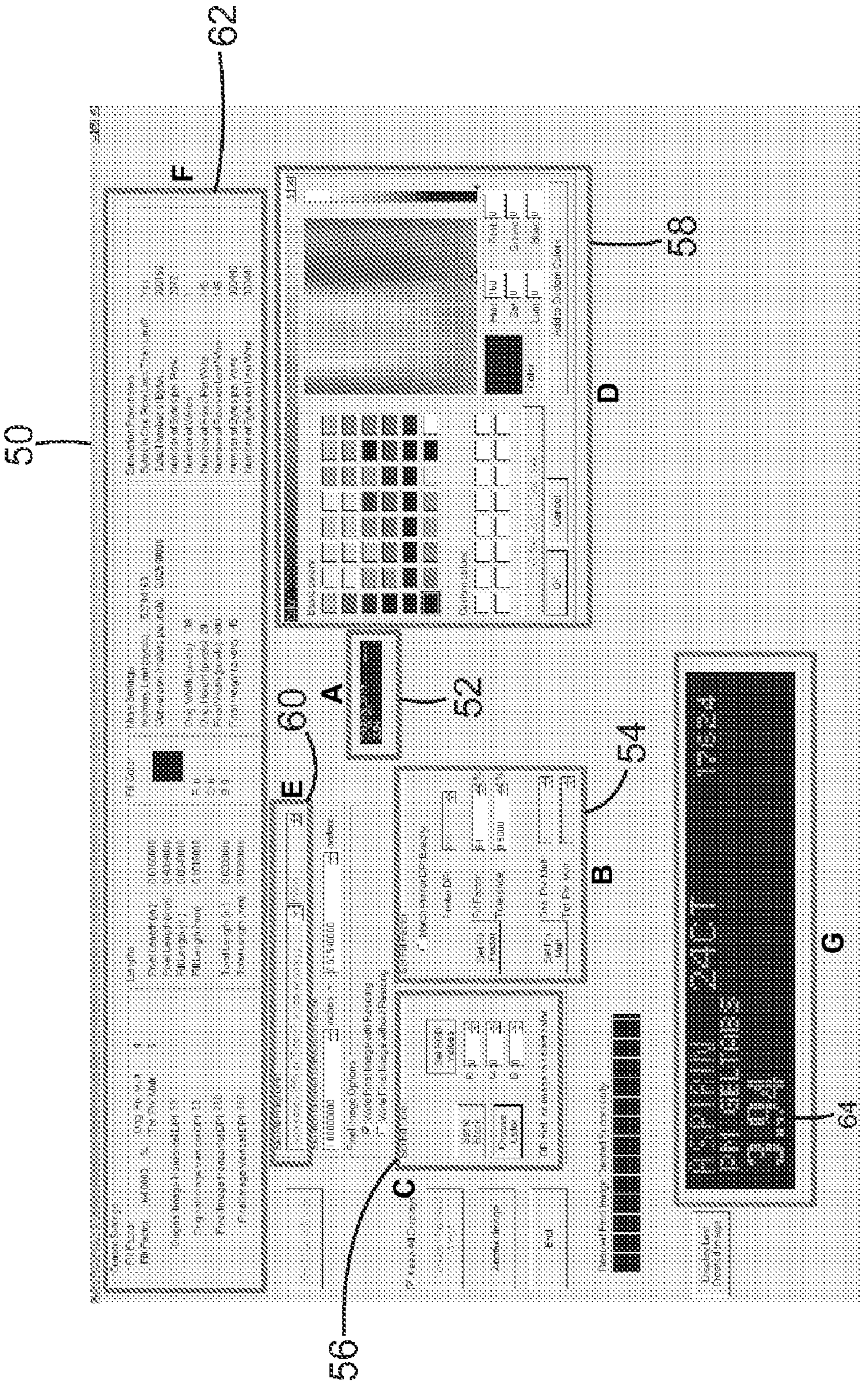
FIG. 6 is a diagram of an exemplary screen for use in implementing a display simulator.

The features of an exemplary interface 50 for the system are shown in FIG. 6. Interface 50 includes various sections, as explained below, to provide information or to receive information or commands. The term "section" with respect to an interface refers to a particular portion of an interface, possibly including the entire interface. Sections are selected, for example, to enter information or commands or to retrieve information or access other interfaces. The selection may occur, for example, by using a cursor-control device to "click on" or "double click on" the section; alternatively, sections may be selected by entering a series of key strokes or in other ways such as through voice commands or use of a touch screen. In addition, although interface 50 illustrates a particular arrangement and number of sections in each screen, other arrangements are possible and different numbers of sections in the interface may be used to accomplish the same or similar functions of displaying information and receiving information or commands. Also, the same section may be used for performing a number of functions, such as both displaying information and receiving a command.

Interface 50 has the following sections.

Section 52: The source image raw data is received and displayed. The raw data can be a bitmap file or in any other compressed format such as JPEG (Joint Photographic Experts Group), GIF (Graphics Interchange format), or PNG (Portable Network Graphics).

Section 54: The fill factor is input in this section. If the simulated image is to be printed, then the ppi of the simulated image must be matched to the printer resolution to ensure an accurate print. In this case the size of the super pixel is constrained by the ratio of the printer resolution in dots per inch (dpi) to the ppi of the source image. For instance, for a 600 dpi printer and a 40 ppi source image the simulation uses a 15 (600/40)×15 (600/40) super pixel array. The number of pixels filled in with the source pixel color is determined by the required fill factor and is entered in the "Orig. Pix. Mult." section. For non-print applications the user enters the fill factor and the tolerance. The software then determines the size of the n×n super pixel array and the number of pixels, m×m, to be filled with the source pixel RGB value to attain the desired fill factor within the tolerance value. Alternatively, the user can manually enter values for m and n. To accurately display the simulated image on a monitor, the number of pixels in the x and y directions must not exceed those on the monitor along the same axes, meaning there should be a one-to-one correspondence between the pixels in the simulation to those on the monitor.

Section 56: The fill color for the background is set in this section. The user has several options as follows: set the fill color to black (R,G,B=0,0,0); choose a color from a palette (section 58); enter specific R, G, B values; or select a color from the source image in section 52 by clicking anywhere within the image.

Section 60: Depending on the size of the source image and super pixel used, the simulated image file can be quite large. For example, the file size for a simulated image of a VGA (Video Graphics Array) resolution source image having 640×480 pixels, using a 20×20 super pixel array with 24 bit color would occupy approximately 370 megabytes. This can exceed the available random access memory (RAM) on many computers, especially if other applications are being run simultaneously and lead to memory issues. To overcome this, the software can optionally process the source image in sections. After the super pixels are created and tiled for each section, the current section of the simulated image is written to a file. The input in this field determines the size of this section and can be entered either as a fraction of the total available memory or as a specific value. Subsequent simulated sections are appended to the pre-existing simulated file. Only a fraction of the simulated image is held in RAM at any one given time. In this scheme, the size of the simulated image is limited only by the available hard drive space. In addition, creating the bitmap (.BMP) file directly, speeds up the simulation process. The source image can also be read and processed in sections and would not be limited by the available RAM.

Section 62: This section displays the current simulation settings including the source and simulated image pixel densities, number of pixels in the source and simulation, fill color, memory allocation, and optionally other settings. In addition, the actual dimensions of the pixels and the inactive area between them in the simulated display are also shown in this section.

Section 64: The simulated image is displayed in this section.

Display Simulator Methodology

Figure 7:
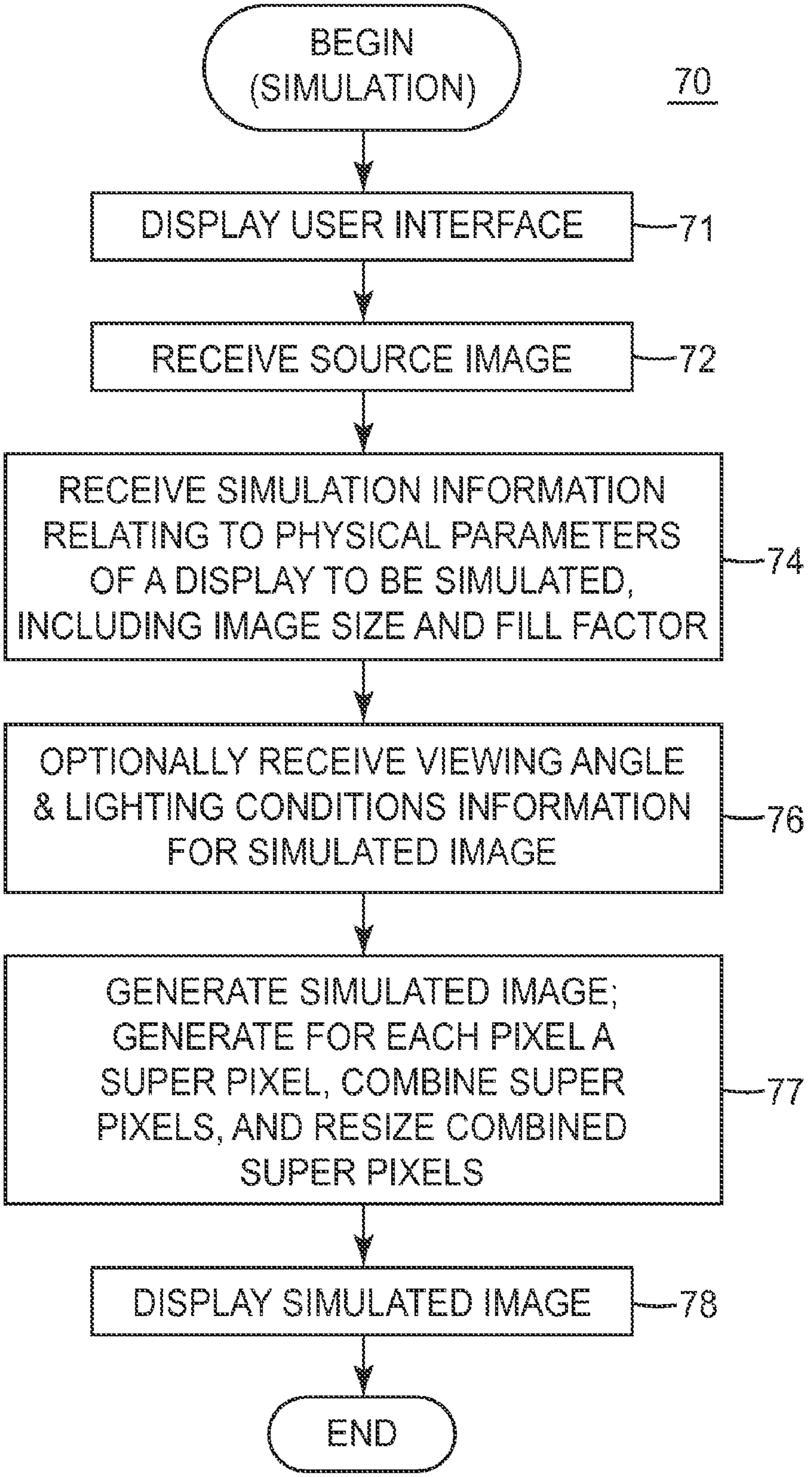
FIG. 7 is a flow chart of a computer-implemented simulation method for creating a simulated display image.

FIG. 7 is a flow chart illustrating a method 70 for creating a simulated display image. This method can be implemented, for example, in software or firmware modules for execution by processor 22 in machine 10. In method 70, a user interface, such as interface 50, is displayed for the user to enter information for the simulation (step 71). The source image is received via the user interface from section 52 (step 72), and simulation parameters are also received via the user interface from sections 54 and 56 (step 74). The system can optionally receive viewing angle and lighting conditions information when a user desires to simulate those conditions (step 76). The system generates a simulated image, which includes generating for each pixel a super pixel, combining the super pixels to form an image, and resizing the combined super pixels as described above (step 77). The simulated image is then displayed (step 78). Displaying the simulated image can involve, for example, displaying it on display device 24 such as an electronic display, or providing it in printed form using output device 18 when implemented as a printer. Display device 24 can be implemented with a pixilated or non-pixilated displays for use in displaying the simulated image. When the simulated image is displayed in printed form, the type of media on which it is printed may affect it's appearance, for example when printed on a glossy versus matte paper.

There are two steps involved in incorporating the angle dependence of the displays in the simulator. The first is physically changing the perspective of the image, by skewing the dimensions of the image. Assuming a rotation about a vertical axis, the width of the image will become narrower. Vertically, one edge expands and appears closer to the viewer, while the opposite edge shrinks and appears farther away, and the image portion in between the edges can be scaled linearly. The result provides the appearance of a rotated image.

The second step is to transform the original colors to a new color based upon the viewing angle. The spectrum of intensity versus wavelength for a color at normal viewing can be measured to characterize the original image colors. Sample data can be obtained from known data that plots peak reflection wavelength against viewing angle, as well as reflectance against viewing angle.

The data points were fit to a second-degree polynomial to produce a model. This model is applied to the spectrum at normal viewing, which results in a reduced and shifted spectrum. The amount of reduction and shift is directly proportional to the viewing angle. Once the new spectrum is calculated, the transformation from spectrum to RGB values occurs. Therefore, the RGB values to fill the pixels for the skewed image have been found, and the rotated image with angle-dependent colors is complete.

The transformation process from spectrum to RGB values will vary under different lighting conditions. As long as the original spectrum is not dependent upon the lighting conditions (it must be measured with lighting cancellation techniques), the new angle-dependent spectrum is not lighting-dependent either. The International Commission on Illumination (CIE) has developed the idea of color spaces, which are ways to associate colors that the human eye perceives with numeric values. These color spaces are used to transform a spectrum to values that the software can process for display of the appropriate color for each pixel on the monitor (display device). The color spaces are shifted based on the input values for the color white. The CIE has also conveniently developed these white values for many lighting conditions. Depending upon which lighting is present, the values for white can be easily modified when the color space is used during the transformation from final angle-dependent spectrum to new angle-dependent RGB values.

Therefore, the simulator takes the image at normal viewing, physically changes the dimensions to give an appearance of rotation, reduces and shifts the color spectrum depending upon the new viewing angle, and applies the correct color space model for the lighting conditions requested during the RGB value calculation from the angle-dependent spectrum.

Simulation Factors and Examples

Figure 8:
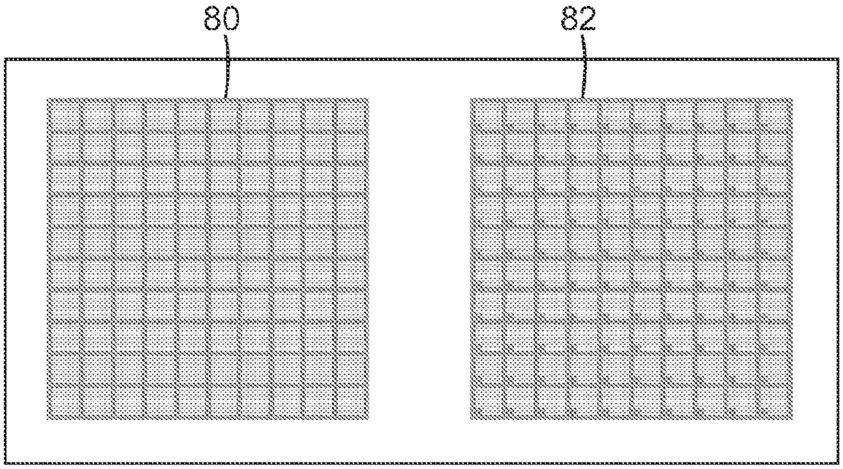
FIG. 8 is a diagram illustrating simulation of passive matrix and active matrix displays.

FIG. 8 is a diagram illustrating simulation of a passive matrix display 80 and an active matrix display 82. The location of the active area relative to the inactive background within the super pixel is representative of a passive matrix display. In such a display, the pixels are formed by the intersection of row and column electrodes. The spacing between the individual rows and columns is limited by the manufacturing process and determines the inactive background area. In an active matrix display each pixel has one or more transistors associated with it, which masks portions of the active area. These features and others such as conductive traces, can easily be included in the simulation by setting the appropriate pixels within the super pixel to the background (or other) color.

Figure 9:
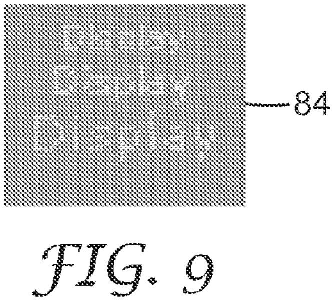
FIG. 9 is a diagram illustrating simulating varying font sizes of an image.

FIGS. 9-12 are images demonstrating the effects of pixel density, font size, font type, and fill factor on the appearance of the simulated display. FIG. 9 is a diagram illustrating simulating varying font sizes of an image 84 having 8, 9, 11 point font, top to bottom, a 64% fill factor, Verdana font, and a 60 ppi pixel density. As shown by image 84, for a 60 ppi display, 8 point font is illegible, at 9 point the letters become discernable, and a font size greater than 11 point is required for good readability.

Figure 10:
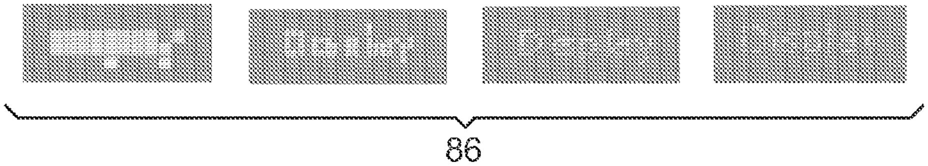
FIG. 10 is a diagram illustrating simulating varying pixel densities of an image.

FIG. 10 is a diagram illustrating simulating varying pixel densities of an image 86 having 20, 40, 60, 80 ppi, left to right, a 64% fill factor, Verdana font, and a 10 point font size. As shown by image 86, at 20 and 40 ppi the letters are illegible, at 60 ppi the letters become discernable, and a pixel density of 80 ppi is required for good readability.

Figure 11:
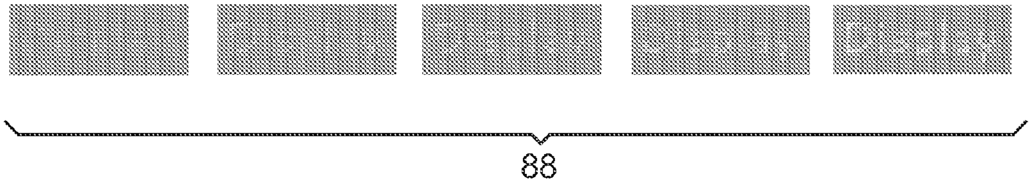
FIG. 11 is a diagram illustrating simulating varying fill factors of an image.

FIG. 11 is a diagram illustrating simulating varying fill factors of an image 88 having fill factors of 25, 36, 49, 64, 81%, left to right, a 60 ppi pixel density, Verdana font, and an 11 point font size. As shown by image 88, the active area increases and hence the displayed text appears brighter with increasing fill factor. The physical dimensions of the pixels and the inactive background region are shown in Table 1.

TABLE 1

| Fill Factor (%) | Pixel Length (microns) | "Dead space" between Pixels (microns) |
|---|---|---|
| 25 | 212 | 212 |
| 36 | 254 | 169 |
| 49 | 296 | 127 |
| 64 | 339 | 85 |
| 81 | 381 | 42 |

Figure 12:
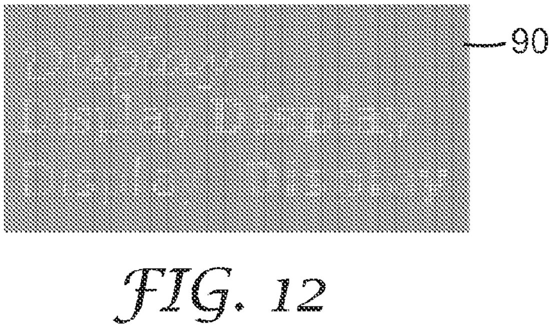
FIG. 12 is a diagram illustrating simulating varying font types of an image.

FIG. 12 is a diagram illustrating simulating varying font types of an image 90 having from top to bottom Lucida Handwriting, Georgia, Verdana fonts, a 40 ppi pixel density, a 64% fill factor, and a 20 point font size. As shown by image 90, the regular (left) and bold (right) versions of the text are also shown for the Georgia and Verdana fonts. At this pixel density a script font such as Lucida Handwriting is not very well rendered and the text appears choppy. Georgia represents a serif font in which decorative embellishments are added to the basic forms of each character. At lower resolutions this can lead to individual characters touching each other, for example the "i" and "s" in "Display." Verdana is a sans serif font designed for the world wide web and is one font useful for lower resolution displays. The letters are well resolved and very readable in both the regular and bold forms even at this pixel density.

Figure 13:
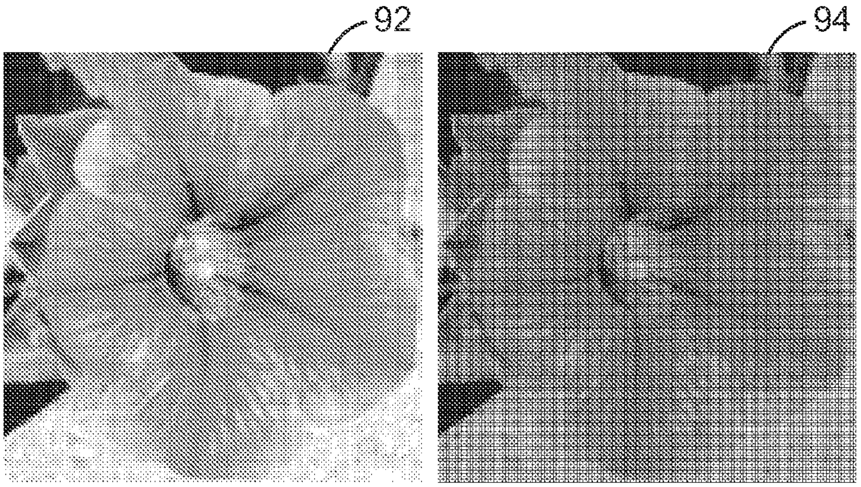
FIG. 13 is a diagram illustrating simulated gray scale images.

FIG. 13 is a diagram illustrating simulated gray scale images. A source image 92 has a pixel density of 60 ppi and a size of 141×145 pixels (2.35 inches×2.42 inches). A corresponding simulated Image 94 has a pixel density of 300 ppi and a size of 705×725 pixels. The simulated image 94 represents the appearance of the source image 92 on a display with a fill factor of 64% and a background color of black.

Figure 14:
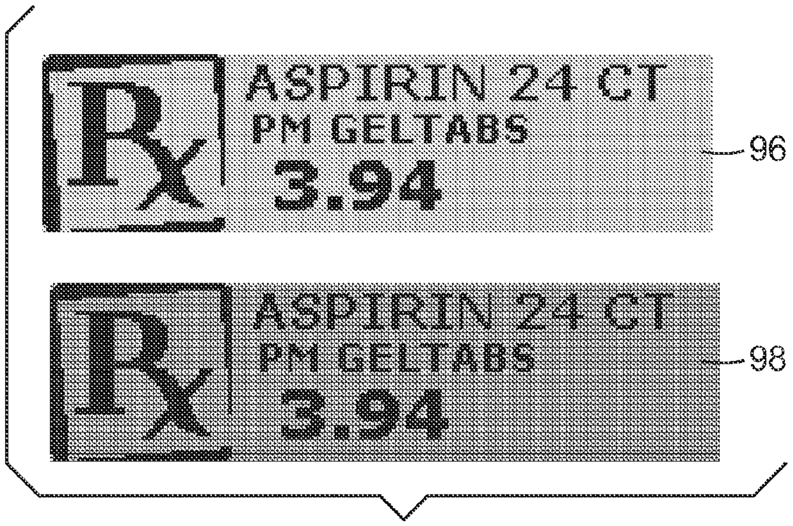
FIG. 14 is a diagram illustrating a simulated image on an electronic shelf edge display.

FIG. 14 is a diagram illustrating a simulated electronic shelf edge display image. A source image 96 has a pixel density of 50 ppi and a size of 188×50 pixels (3.76 inches×1 inch). A corresponding simulated image 98 has a pixel density of 250 ppi, a fill factor of 64%, and a size of 940×250 pixels (3.76 inches×1 inch).

Electronic shelf labels are potential replacements for the printed price tags currently being used. They offer significant advantages including the following: lower labor and material costs over the long run since they can be remotely updated and do not need to be replaced when the content does; improved pricing accuracy; and ease of updating. Various two color combinations (yellow/black, black/white, and blue/white) can be achieved using cholesteric liquid crystal, electrophoretic, and electrochromic display technologies respectively.

While the present invention has been described in connection with an exemplary embodiment, it will be understood that many modifications will be readily apparent to those skilled in the art, and this application is intended to cover any adaptations or variations thereof. For example, different interface sections and machines may be used without departing from the scope of the invention. This invention should be limited only by the claims and equivalents thereof.

The invention claimed is:

1. A method for generating and providing a simulated image, comprising:
- receiving a source image;
- receiving first parameters for a first display device; and
- generating and displaying, using a processor, a simulated image on a second display device having second parameters, wherein the first parameters are different from the second parameters, and wherein the simulated image displayed on the second display device provides a visual indication of how the source image would appear when displayed on the first display device, wherein the generating and displaying step includes:
  - generating for each pixel in the source image a super pixel, each of the super pixels having a greater size than each of the corresponding pixels;
  - combining the super pixels to form an image; and
  - resizing the image to generate the simulated image.

2. The method of claim 1, wherein the receiving the parameters step includes receiving a resolution and a fill factor.

3. The method of claim 1, wherein the receiving the parameters step includes receiving a width and a height of the source image.

4. The method of claim 3, wherein the generating and displaying step includes resizing the source image.

5. The method of claim 1, wherein the generating and displaying step includes providing the simulated image in printed form.

6. The method of claim 1, wherein the generating and displaying step includes providing the simulated image on a display device.

7. The method of claim 1, further comprising displaying a user interface for a user to enter the first parameters.

8. The method of claim 7, wherein the displaying the user interface step includes displaying a section for the user to enter a fill factor for the simulated image and information relating to a size of the simulated image.

9. An apparatus for generating and providing a simulated image, comprising:

an image module for receiving a source image;

a parameters module for receiving first parameters for a first display device; and a generate module for generating and displaying a simulated image on a second display device having second parameters, wherein the first parameters are different from the parameters, and wherein the simulated image displayed on the second display device provides a visual indication of how the source image would appear when displayed on the first display device, wherein the generate module includes:

a module for generating for each pixel in the source image a super pixel, each of the super pixels having a greater size than each of the corresponding pixels;

a module for combining the super pixels to form an image; and a module for resizing the image to generate the simulated image.

10. The apparatus of claim 9, wherein the image module includes a module for receiving a resolution and a fill factor.

11. The apparatus of claim 9, wherein the parameters module includes a module for receiving a width and a height of the source image.

12. The apparatus of claim 11, wherein the generate module includes a module for resizing the source image.

13. The apparatus of claim 9, wherein the generate module provides the simulated image in printed form.

14. The apparatus of claim 9, wherein the generate module provides the simulated image on a display device.

15. The apparatus of claim 9, further comprising a module for displaying a user interface for a user to enter the first parameters.

16. The apparatus of claim 15, wherein the display module includes a module for displaying a section for the user to enter a fill factor for the simulated image and information relating to a size of the simulated image.

* * * * *